United States Patent [19]

Vogel

[11] 4,118,267
[45] Oct. 3, 1978

[54] SYNTHETIC RESIN FRAMES AND A PROCESS FOR THEIR PRODUCTION

[75] Inventor: Karl Heinz Vogel, Höhfröschen, Fed. Rep. of Germany

[73] Assignee: Gebrüder Kömmerling Kunststoffwerke G.m.b.H., Pirmasens, Fed. Rep. of Germany

[21] Appl. No.: 781,449

[22] Filed: Mar. 25, 1977

[30] Foreign Application Priority Data

Mar. 29, 1976 [DE] Fed. Rep. of Germany ....... 2613402

[51] Int. Cl.² .......................... B29C 27/02; E04C 2/38
[52] U.S. Cl. ...................................... 156/293; 52/656; 156/304; 156/305
[58] Field of Search ............... 403/265, 401, 270, 295; 285/55, 286, 423, DIG. 20; 52/656, 657, 309.1; 156/304, 294, 322, 305, 293

[56] References Cited

FOREIGN PATENT DOCUMENTS 2,336,839 2/1975 Fed. Rep. of Germany .............. 52/656
2,113,804 10/1972 Fed. Rep. of Germany ........... 403/295

Primary Examiner—John E. Murtagh
Attorney, Agent, or Firm—Michael J. Striker

[57] ABSTRACT

A frame for doors, windows and the like is provided. The inventive frame comprises, in combination, a plurality of elongated frame components interconnected by welding joints, each component further comprising a thermoplastic synthetic resin hollow profile having an interior extending along the length of said profile, and, at least one of the joints, a thermoplastic synthetic resin reinforcement having an outer surface lying against the inner surface of at least two hollow profiles of the joint and extending across the welding joints, said reinforcement being unitary with said surrounding hollow profiles.

6 Claims, 4 Drawing Figures

SYNTHETIC RESIN FRAMES AND A PROCESS FOR THEIR PRODUCTION

BACKGROUND OF THE INVENTION

The invention relates to a frame for doors, windows and the like.

The frames of the invention have hollow profile components made out of thermoplastic synthetic resin. The components are welded together by a corner joint, a cross joint or a tee joint. The expression "door frame" and "window frame" as used herein apply not only to the stationary frames of doors and windows, but additionally to moving frames, e.g., frames forming part of the moving part of a window or door.

Attempts have been made to butt-weld hollow profile frame components together by way of the miter-cut surfaces of the corners of the frame. The welding can be a tee joint, in which two or three components are joined together in a T-shape at the welding seam. The components can also be joined in a cross joint by uniting the components to each other at a right angle to form a cross. A third alternative for holding the components is the use of a corner joint, in which the components to be welded are joined at their end surfaces at an angle, usually a right angle.

In known window frames in which the hollow profile components are welded together, the corners of the frame can additionally be foamed. But then, the known frame components of the thermoplastic synthetic resin may under the influence of temperature become subject to considerable stress at the location of the weld, particularly if the components are welded into a tee joint by Y-welding, and the frame corner is formed in part by a cross bar which subdivides the frame (here and in the following paragraphs, the section of a complete frame defined by such a cross bar should be included within the concept of "frames"). Such pressure may be the result of thermal stress, which is promoted when the components are darkly pigmented and therefore more strongly absorb radiation. Generally, the thermal stress develops as a result of thermal expansion of the frame components and possibly at high temperatures due to shrinking processes already initiated by exposure to sunlight. Because of this stress, fissures can develop at the welding seam, especially since the strength of the thermoplastic synthetic resin weakens with rising temperature.

SUMMARY OF THE INVENTION

It is a chief object of the invention to overcome the aforementioned disadvantages.

It is another object of the invention to provide a frame made from welded hollow profile components composed of thermoplastic synthetic resin and to provide a process for the production of the inventive frame. In the inventive process, the strength of the welding connection is substantially increased and, among other benefits, the risk of subsequent damage to the weld connection due to the effects of temperature is substantially reduced.

The inventive frame of the previously mentioned type is provided with reinforcement of thermoplastic synthetic resin. The reinforcement is located at at least one welding location and advantageously at all of the welding locations, and the reinforcement bridges the weld within the interior of the frame. The reinforcement and the welded frame components are joined into one piece.

The load-bearing cross section is substantially increased in the area of the welding and the strength of this area is correspondingly increased by means of the inventive reinforcement. The inventive reinforcement at the welding seam can be accomplished relatively easily while avoiding the high costs characteristic of known corner connections since the strength and stability of the known corner connections must be provided by the connection itself.

The inventive process is suitably adaptable to both stationary and moving frames. Although the invention can be applied to all corner weldings in which frame sections abut upon each other to form a corner, the invention is preferably used with tee joints because these corner welds are particularly susceptible to thermal stress.

Preferably, the welding of the components is a thermal welding in which the components to be welded are heated to the welding temperature at the mitre surfaces and are pressed together in a heated state. However, it is possible to solvent weld by using a solvent to soften the components at the location of the welding and by subsequently driving off the solvent during production of the connection.

The one-piece construction of the reinforcement and the frame component is advantageously effected by means of a connecting material, such as an adhesive, cement or glue, although if desired, an appropriate connection can be formed with the use of a suitable solvent.

The inventive reinforcement can be a prepared one-piece reinforcement profile which is inserted into the frame components before the components are welded. The frame components are then pushed together and welded. The unitary connection of one frame component and the reinforcement can be effected prior to joining the frame components while the unitary connection of the reinforcement to the other frame component can be completed after the welding for example by means of hardening a previously applied adhesive or expelling a previously applied dispellable solvent.

With such a constructed one-piece reinforcement, it is also possible to form both unitary connections of the reinforcement to the frame components before or after the welding of the frame components. The use of such a one-piece constructed reinforcement is particularly feasible when the welding of the frame components is brought about by a solvent welding or another welding process in which the inserted reinforcement projecting from one frame component prior to the welding together of the frame components does not prevent sufficient softening of such one frame component at the weld location or does not prevent the pushing of the other frame component (already heated where it is to be welded) into place on the reinforcement.

The generally preferred welding for producing window frames is normally done by holding a heating plate between the welding surfaces of the frame components in order to simultaneously adequately heat the weld surfaces of the frame components. The heating plate is then removed, and the frame components are pushed together with their heated welding surfaces against each other. This kind of welding would be interfered with by a reinforcement projecting from a frame component.

Therefore, it is proposed in an inventive embodiment that the reinforcement be constructed from reinforcing sections. These reinforcing sections, each within a respective one of the frame components, are formed as one-piece with this component. In the area of the butt joint of the frame components, the reinforcing sections, in a one-piece construction with respective ones of the frame components, are butt-welded together along with the frame components. With this preferred approach, the reinforcing sections are already inserted into and united with a respective component by means of a connecting material before the welding of the components. As a result, the reinforcing parts do not slip as the frame components are compressed along the butt joint. With such a procedure, the reinforcing parts can, for instance, be softened together with the frame components in the above-mentioned process and can be welded together to form the reinforcement. In this case, the weld surfaces of the frame components and their reinforcing sections are advantageously compactly sealed together flush at the welding surfaces.

If desired, the reinforcement can be made out of a solid profile. However, it is preferred that at least one hollow profile be used as the reinforcement. The hollow profile abuts upon at least three sides of at least one longitudinal hollow interior of the frame-component profile in line contact therewith along at least one line of contact, but preferably in surface contact. In this case, the reinforcing hollow profile can be geometrically similar to the inner profile of the frame component so that the reinforcing hollow profile is unitarily connected upon its entire outer peripheral surface to the frame component hollow profile. However, it is also possible to reinforce the welding connection only at the portions of the butt joint particularly susceptible to strain. In connection with this limited reinforcement, the reinforcement is preferably constructed as a hollow profile in such a manner that the reinforcement borders only a part of the hollow interior of the frame component and is unitarily joined thereto only at portions of the inner surface of the frame component.

Frequently, the reinforcement only has to extend along the contour of the hollow defined by the inner walls of the frame components. The desired effect of strengthening can be further promoted by providing the reinforcement with at least one cross bar transversely spanning the hollow cross section of the frame component at the location of the butt joint. This cross bar can be advantageous for compensating for thermal stress.

As has been previously disclosed, the reinforcement can consist of a single solid or hollow profile. It is also possible to form the reinforcement from several sections of reinforcing profile bridging over the location of the butt joint. For instance, the reinforcement can be constructed from a hollow profile member and a separate flat profiled member. Also, highly profiled hollow frame components, for example of complicated cross-section, can be strengthened by means of several sections of reinforcing profiles bridging over the location of the butt joint without requiring reinforcing members of correspondingly highly profiled or complicated cross section. This reinforcement occupies only a portion of the hollow space; therefore, a relatively simple reinforcing profile can be used together with a complexly profiled frame component profile.

The inventive process for producing a door or particularly a window frame out of thermoplastic synthetic resin hollow profile frame components butt-welds the frame components together at the suitably prepared welding surfaces particularly with heating to form the frame. The inventive process itself follows in part from the previous description of the frame. Preferably, at least one section of reinforcing profile is unitarily connected within the respective frame component prior to the welding in which the frame components are continuously fused at the respective welding surfaces. Therefore, the reinforcing sections can not slip during the bringing together and welding of the frame components. Thereafter, the reinforcing sections are butt-welded together along with the butt-welding of the frame components and form a reinforcement spanning the butt joint location. This can be done by heating the reinforcing sections along with the welding surfaces of the frame components after sufficient solidification of the connecting-medium connection between the reinforcing sections and the respective frame components. After their insertion and connection, the reinforcing sections terminate at least approximately in the area of the welding surfaces of the frame components to be connected. The frame components, generally, are previously cut to a mitre angle, in which case the reinforcing sections are similarly mitre-cut. The ends of the reinforcing sections to be welded terminate in the area of the welding surfaces of the frame components in such a way that the welding surfaces of the reinforcing sections are pressed against each other and welded as the welding surfaces of the frame components are pressed against each other.

The unitary connection between the sections of the reinforcement and the respective frame components can be produced by means of solvent cementing in which the size of the joint is minimized. The reinforcing pieces can be glued to the frame components by using a suitable glue with a glue joint. By using window material for the reinforcement (preferably highly impact resistant polyvinylchloride) and an appropriate glue, it is possible to make a homogeneous connection by rendering the materials plastic during the welding process.

In the welding process for the welding of the frame components, the reinforcing material does not appear at the surface of the frame and also, because of the insertion of the reinforcement, the reinforcing material does not touch the usual veneer of the frame components at the welding seam. However, a substantial increase in strength is imparted to the welding connection.

The welding of the frame components can take place in conventional manner. The inventive proposal places an enlargened welding cross section at the welder's disposal. The cross section can be, for example, twice as great as when the frame components are used alone. Furthermore, a satisfactory conduction of force from the frame components to the reinforcement is assured by the one-piece construction of the frames and reinforcements.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
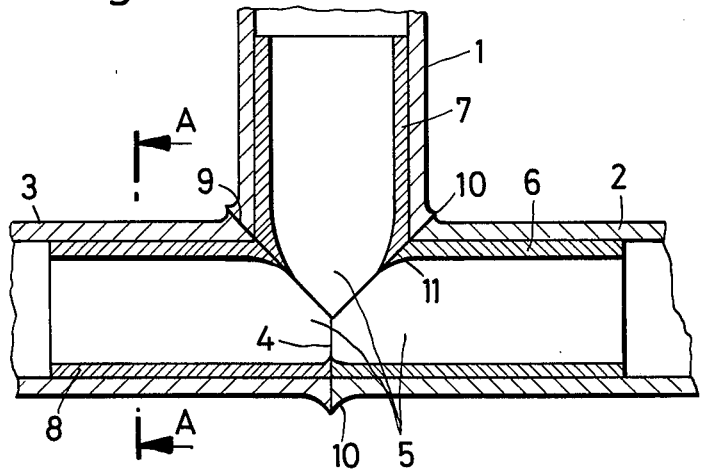
FIG. 1 is a partial longitudinal cross section of a frame in the area of a tee joint connection of three frame components made by means of Y-welding.
Figure 2:
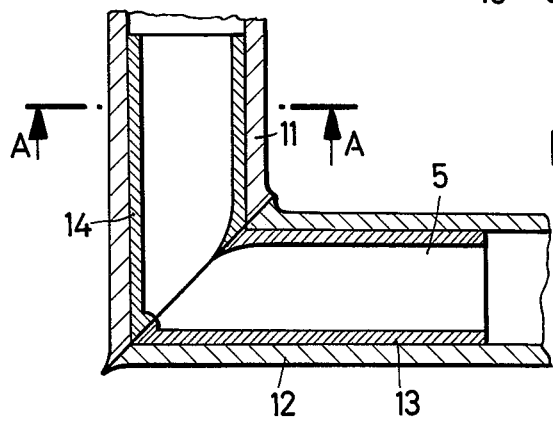
FIG. 2 is a partial longitudinal cross section in the area of a frame corner, which is formed from two previously cut frame components welded together at the mitre surfaces.

The frame component profiles are illustrated in FIGS. 1 and 2 as rectangular profiles for simplicity. However, this illustration should also be considered exemplary of more intricate profiles, as well.

FIG. 1 shows three frame components 1, 2, 3 butt-welded together in a tee joint along a Y-welding seam 4. The weld location is bridged across within the interior of the hollow profile frame components by a reinforcement 5, which is made out of three reinforcing profile sections 6, 7, 8. The sections 6, 7, 8 are butt-welded together into a T-shape at their ends, along the Y-welding seam 4. On their outer peripheral surfaces, the reinforcing sections are glued to the inner peripheral surfaces of the frame components. The length of the reinforcing profile advantageously extends one to five fold or preferably two to three fold more than the longest possible transverse straight line through the hollow region of the frame component.

The gluing of the profile sections 6, 7, 8 to the inner periphery of the frame components 1, 2, 3 occurs prior to the welding. Before or after the gluing, the profiled sections 6, 7, 8 are cut to correspond to the edges of the welding surfaces 9 of the frame components 1, 2, 3 such that sections 6, 7, 8 terminate in the planes of the welding surfaces 9 for heating and welding.

Before heating and welding, the applied adhesive advantageously has become completely firm, at least to the extent of preventing the frame components from slipping after the profiled sections are pressed butt-wise against each other during welding. After the preparation for the welding, the welding surfaces of the frame components and those of the profiled reinforcing sections are heated together by means of an appropriate apparatus. Then the respective welding surfaces are pressed together. Because of the pressure applied during the welding, some material of the frame component is outwardly displaced, forming a welding ridge 10 upon the outer periphery of the welding seam. Similarly, some material of the reinforcing profile sections is inwardly displaced away from the frame component, with the displaced material forming a ridge 11 upon the inner periphery of the welding seam of the reinforcing sections. Substantially no welding overflow is displaced on the inner periphery of the welding seam of the frame component and on the outer periphery of the welding seam of the profiled reinforcing sections since the material of the frame components and the reinforcing sections abut against each other.

The outer ridge 10 can be smoothed in conventional manner after the welding and solidification of the welded connection. When thermal stress is manifested in the frame component during later use of the frame, this stress cannot damage the welding connection since the reinforcement 5 counteracts distortion and shrinkage effects due to this stress. This counteraction is a consequence of the unitary connection of the reinforcement 5 with the frame components. The reinforcing sections are practically integral constituents of the frame components after the production of the unitary connection. Therefore, the welding surface available for the welding of the frame components is consequently increased. Thus, the strength of the welding connection is additionally increased.

The length of the adhesion and therefore, the length of the reinforcing section can be adapted to the stresses which are expected to be absorbed by the frame.

FIG. 2 illustrates the construction of a frame corner with two bevelled buttressed frame components 11, 12 by welding them together by a so-called "corner joint". Two reinforcing sections 13, 14 are inserted within the respective frame component 11, 12 before the welding. The reinforcing sections in the respective frame component are fixed together so that the reinforcing sections 13, 14 are butt-welded together corresponding to the bevel-cut welding surfaces on the bevelled surfaces of the frame components 11, 12, when the welded connection for the frame components is produced.

Figure 3:
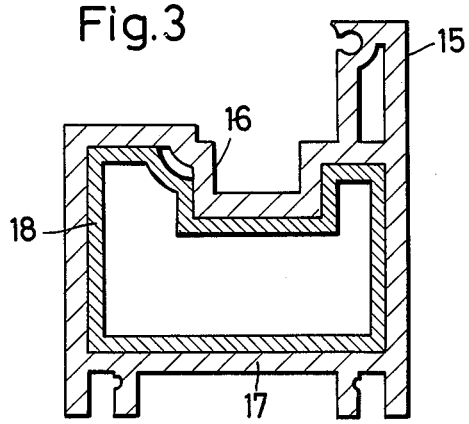
FIGS. 3 and 4 are cross sections of two embodiments through a frame component in the area of the welding location such as along the section lines A—A in FIGS. 1 and 2.
Figure 4:
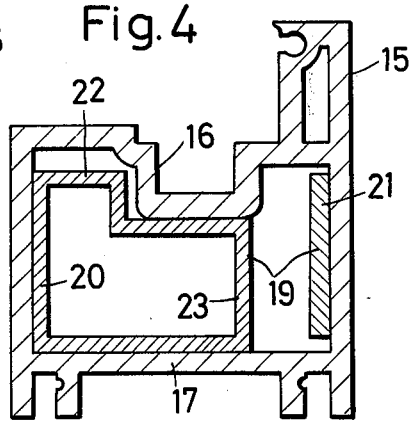

FIGS. 3 and 4 respectively illustrate cross sectional views of a component frame having a fixed reinforcement. The views of these FIGURES correspond in general to the section plane A—A shown in both FIG. 1 and FIG. 2. However, a known sash or window frame profile is illustrated for the frame components in FIGS. 3 and 4. These known profiles have a stop 15 with a hollow box profile and a longitudinal groove 16 on the outer periphery of a sash frame on the inner periphery of a window frame for the accommodation of holding bars or the like. The walls defining the longitudinal groove 16 is inwardly stepped toward the interior of the hollow profile of the frame component 17 so that the frame component 17 has a hollow profile which deviates from simple rectangular.

In FIG. 3, the outer profile of the reinforcement 18 substantially follows the form of the inner profile of the hollow frame component 17, so that the reinforcement 18 is substantially unitary on its entire periphery with the frame component 17.

FIG. 4 illustrates the possibility of constructing a reinforcement 19 with a simple profile out of several profiled sections of simpler cross section from the inner profile of the frame component 17. The reinforcement 19 has two reinforcing sections 20 and 21. The section 20 has a simple hollow angle shape with unequal sides and the section 21 has a plate profile with solid cross section. The section 20 is made unitary, for example, with the side opposite the groove 16 and with for example the inner surface of the frame component proceeding parallel to the base of the transverse groove 16. The unitary connection of section 20 connects its planar outer sides with the planar inner surfaces near the stop 15. The free unconnected front portions of section 20 extend at a distance from the opposite inner surface of the frame component 17 so that cross bars 22 and 23 through the hollow cross section of the frame are formed. The cross bar 23 particularly produces a reinforcement which prevents thermal stress induced distorting movements of the inner and outer walls of the frame at the location of the weld.

Distortion on the sides of the frame parallel to the groove 16 is prevented by means of the unitary connection of the reinforcing section 21 to the frame. On those sides of component 17 which are not directly unitarily connected with the reinforcing sections 20 or 21, for example, the welded connection is less imperiled by distortion due to the profiling; nevertheless, the welded connection is extensively reinforced by means of the unitary connection of the reinforcement 19. The reinforcing sections 20 and 21 can each also be formed of separate reinforcing parts which including the cross bars 22, 23 at the butt-joint are butt-welded together with the constituent frame components of the welded connection.

It will be understood that each of the elements described above, or two or more together, may also find a useful application in other types of combinations differing from the types described above.

While the invention has been illustrated and described as embodied in a particular frame and joints, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process for the production of a reinforced frame for doors, windows and the like, comprising the steps of providing a plurality of tubular frame components of synthetic thermoplastic material, each component having an inner boundary face, and a plurality of reinforcements of synthetic thermoplastic material, each reinforcement having outer boundary face portions and respective end faces; inserting one of said reinforcements into each of said tubular frame components; unitarily bonding at least the greatest part of the outer boundary face portions of each reinforcement into a surface-to-surface engagement with the inner boundary face of each respective frame component so as to prevent potential slippage of said reinforcements and to substantially reinforce each of said tubular frame components; welding the ends of adjacent areas of said tubular frame components together at a first interface; and welding the respective end faces of said reinforcements together at a second interface located in the plane of the first interface.

2. A process as defined in claim 1, said step of unitarily bonding being performed by applying an adhesive between the inner boundary face of each of said tubular frame components and the outer boundary face portions of each of said reinforcements.

3. A process as defined in claim 1, said step of unitarily bonding being performed by applying a dispellable solvent between the inner boundary face of each of said tubular frame components and the outer boundary face portions of each of said reinforcements, and subsequently expelling said solvent.

4. A process as defined in claim 1, at least one reinforcement being unitarily bonded over its entire outer boundary face portions.

5. A process as defined in claim 1; further comprising providing two second reinforcements each having outer boundary face portions and respective end faces; inserting each of said second reinforcements into a respective one of said tubular components; unitarily bonding part of the outer boundary face portions of each of said second reinforcements into surface-to-surface engagement with the inner boundary face of said respective one tubular frame component; and welding the respective end faces of said second reinforcements together.

6. A process as defined in claim 1, said step of providing being performed by providing tubular reinforcements; and said step of welding the reinforcements being performed by heating the respective end faces of said reinforcements and subsequently pressing the respective end faces together so as to inwardly displace some material of said reinforcements away from said frame components to thereby form a ridge upon the inner periphery of said tubular reinforcements, the ridge effectively increasing the thickness of said reinforcements at the location of the second interface.

* * * * *